United States Patent
Chen

(10) Patent No.: US 6,513,823 B1
(45) Date of Patent: Feb. 4, 2003

(54) SHOCK ABSORBER STOPPER FOR A BICYCLE

(75) Inventor: Ting-Hsing Chen, Tainan Hsien (TW)

(73) Assignee: Far Great Plastics Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 09/996,982

(22) Filed: Nov. 30, 2001

(51) Int. Cl.$^7$ ................................................ B62K 25/04
(52) U.S. Cl. .................. 280/284; 280/287; 403/DIG. 4; 403/321
(58) Field of Search ................................ 280/284, 283, 280/288, 281.1, 276, 275, 287; 70/225, 233, 234; 301/124.2, 110.5; 403/409.1, 325, DIG. 8, DIG. 4, 321

(56) References Cited

U.S. PATENT DOCUMENTS

| | | | | |
|---|---|---|---|---|
| 5,284,354 A | * | 2/1994 | McWethy | 280/281.1 |
| 5,474,318 A | * | 12/1995 | Castellano | 280/227 |
| 5,685,553 A | * | 11/1997 | Wilcox et al. | 280/281.1 |
| 5,826,899 A | * | 10/1998 | Klein et al. | 280/284 |
| 6,109,636 A | * | 8/2000 | Klein et al. | 280/275 |
| 6,164,676 A | * | 12/2000 | Wilcox | 280/284 |
| 6,170,845 B1 | * | 1/2001 | Tseng | 280/284 |
| 6,189,908 B1 | * | 2/2001 | Lu | 280/284 |
| 6,203,042 B1 | * | 3/2001 | Wilcox | 280/275 |
| 6,354,618 B1 | * | 3/2002 | Liao | 280/278 |

* cited by examiner

Primary Examiner—F. Zeender
(74) Attorney, Agent, or Firm—Rosenberg, Klein & Lee

(57) ABSTRACT

A shock absorber stopper for a bicycle comprises a seat pipe having its top end connected to a seat, and its bottom portion connected to a connecting device for pivoting the top end of a shock absorber by a quick-release connector, and a rear fork coupled to a bracket on the rear end of a cross bar of a frame including the seat pipe to receive a rear wheel thereat. The bottom end of the shock absorber is pivoted to the rear fork of the frame. The connecting device of the seat pipe comprises a stopping unit preventing the shock absorber from disengagement.

1 Claim, 5 Drawing Sheets

SHOCK ABSORBER STOPPER FOR A BICYCLE

BACKGROUND OF THE INVENTION

1. Field of the Invention

This invention relates to a bicycle shock absorber and more particularly to a stopping unit preventing the shock absorber from disengagement accidentally.

2. Description of the Prior Art

A conventional shock absorber for a folding bicycle is mostly connected to the seat pipe with a quick-release connector and the rear fork, perpendicularly, to absorb the bumping road ride. This design requires a user to loosen the quick-release connector first and then fold the bicycle. However, after so many times of fasten and loosen the quick-release connector, the connecting area wears out and causes rattling at the connecting area, which may even cause an accident.

In view of this, the inventor has invented the present invention to improve the shortcomings.

SUMMARY OF THE INVENTION

It is the primary object of the present invention to provide a shock absorber stopper for a bicycle, which provides an additional protection of the shock absorber from disengagement.

It is another object of the present invention to provide a shock absorber stopper for a bicycle, which is safe to user.

It is a further object of the present invention to provide a shock absorber stopper for a bicycle, which is easy to operate.

DETAILED DESCRIPTION OF THE PREFERRED EMBODIMENT

Figure 1:
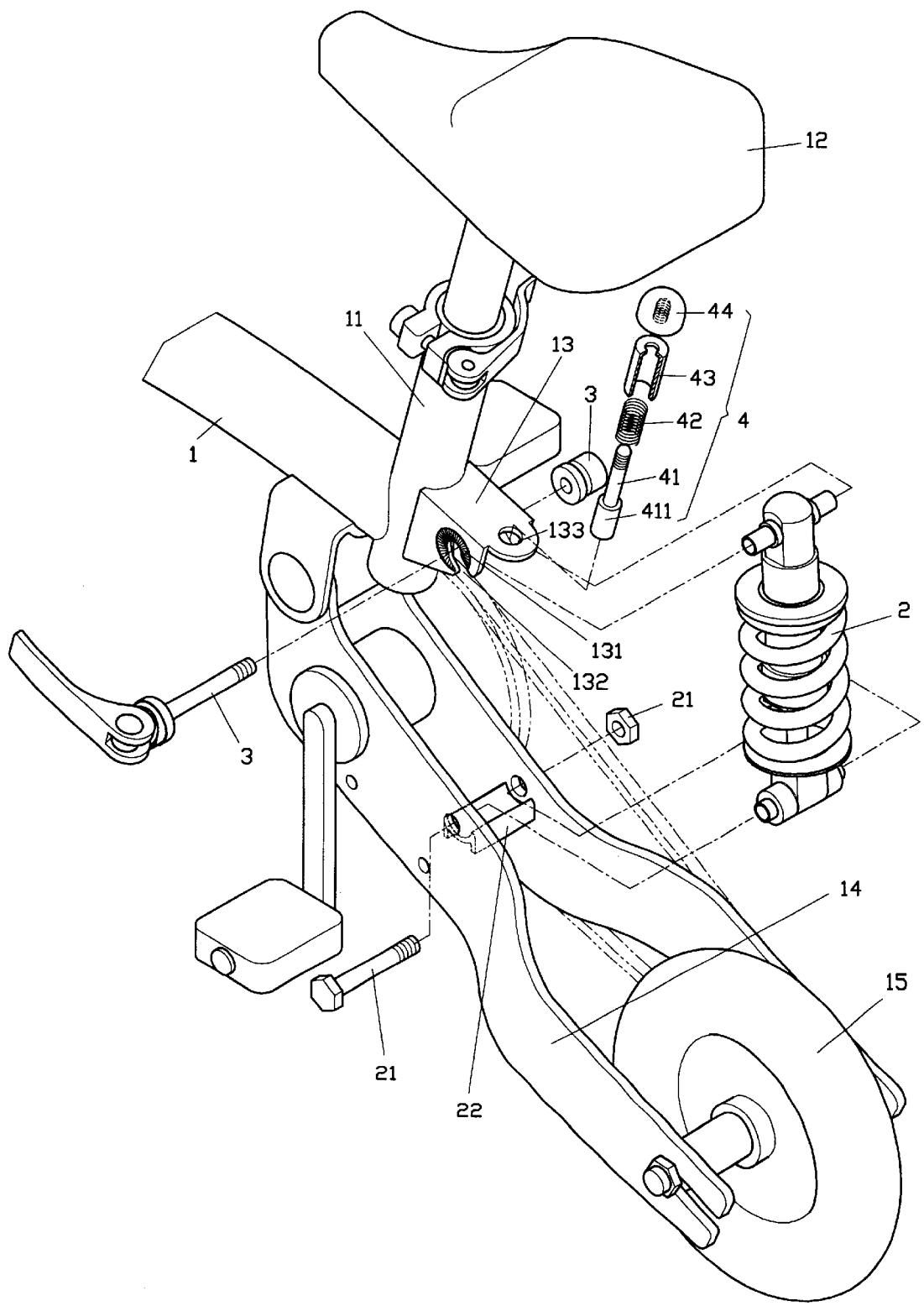
FIG. 1 is an exploded view of the present invention.
Figure 2:
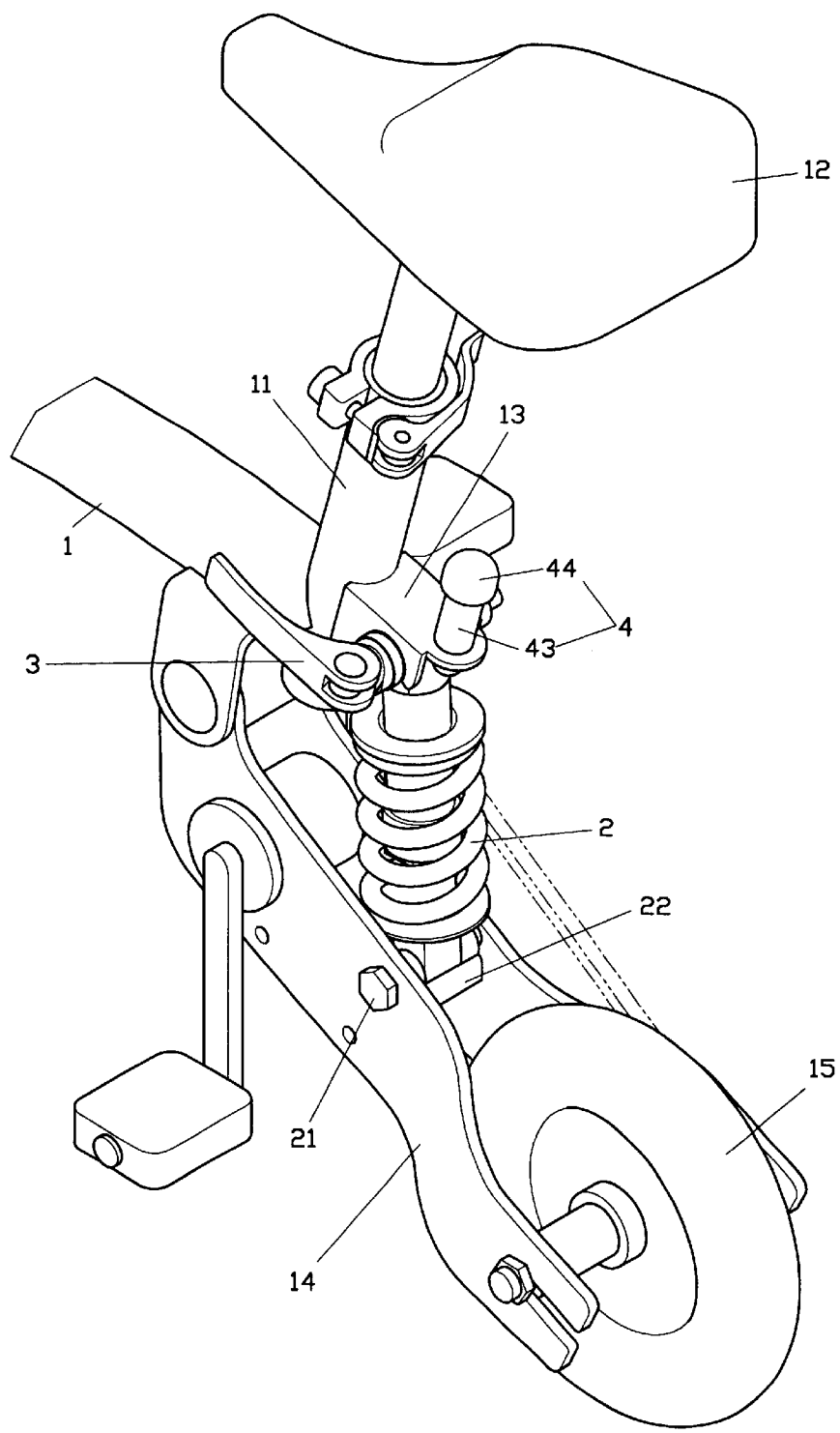
FIG. 2 is a perspective view of the present invention.

A shock absorber stopper for a bicycle 1 of the present invention, as shown in FIGS. 1 and 2, comprises a seat pipe 11 with its top secured with a seat 12, and the bottom portion secured with a connecting device 13, a rear fork 14 coupled to a bracket on the rear end of a cross bar of a frame including the seat pipe to receive a rear wheel 15 thereat. The top end of a shock absorber 2 is pivoted to the connecting device 13 by a quick-release connector 3, whereas the bottom end of the shock absorber 2 is seated on a reinforcement 22 and secured to the rear fork 14 by means of a fastener 21.

The connecting device 13 of the seat pipe 11 has a recess 131 at respective sides thereof with a slot 132 extending towards the edge, the top portion of the connecting device 13 has an aperture 133 adapted for a stopping unit 4 to insert there through.

The stopping unit 4 comprises a stopper 41, a spring 42, a barrel 43 and a block 44. The stopper 41 has a stopper head 411 at one end. The stopper 41 is inserted through the spring 42, the aperture 133, the barrel 43, with a portion outward from the barrel 43 and secured with the block 44. The stopper head 411 is located in the connecting device 13, which blocks the shock absorber 2 from being disengaged.

Figure 3:
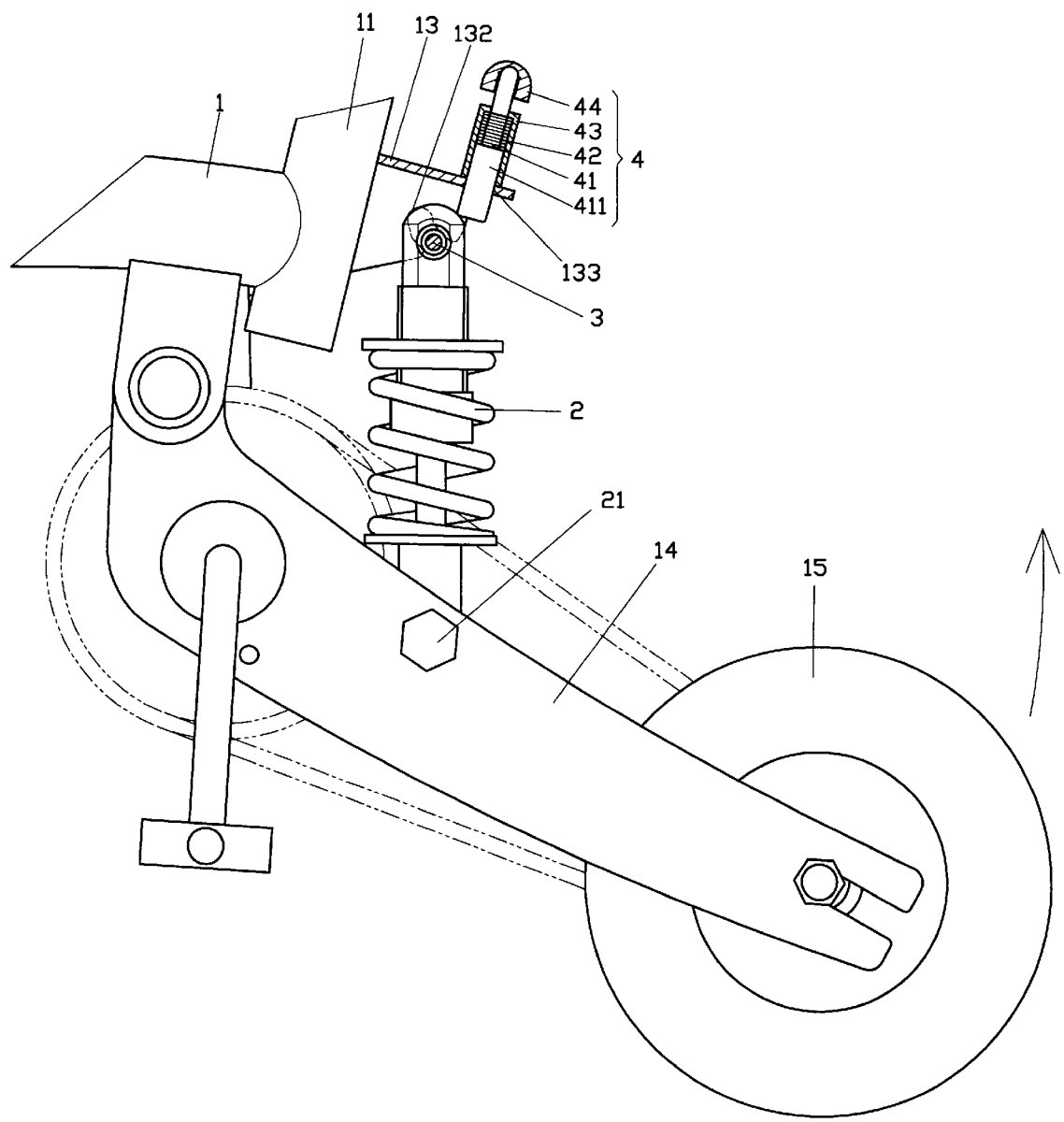
FIG. 3 is a side view of the present invention.
Figure 4:
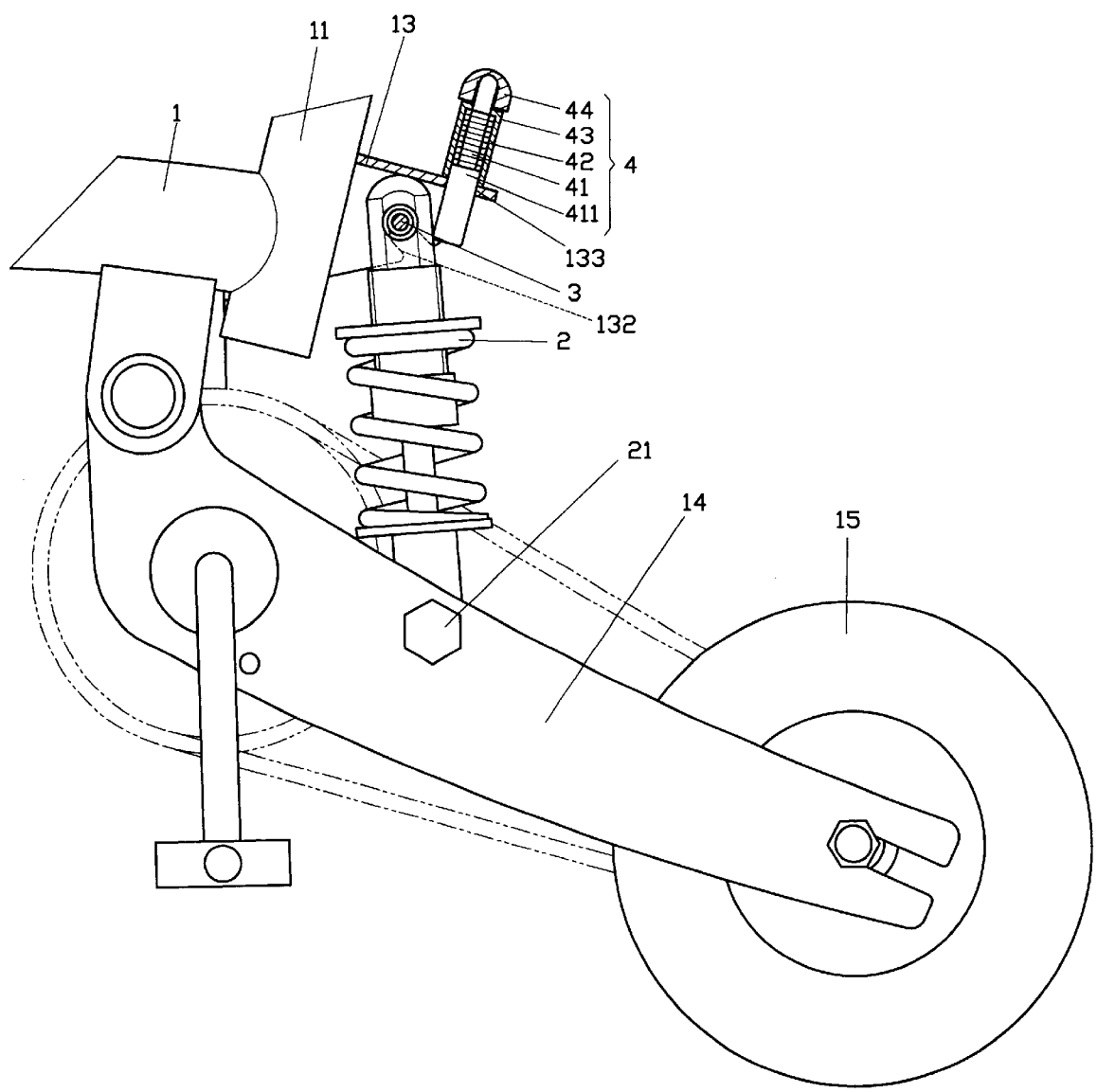
FIG. 4 is a view similar to FIG. 3, showing a stopper stopping the shock absorber from disengagement when a pressure is applied onto the shock absorber.
Figure 5:
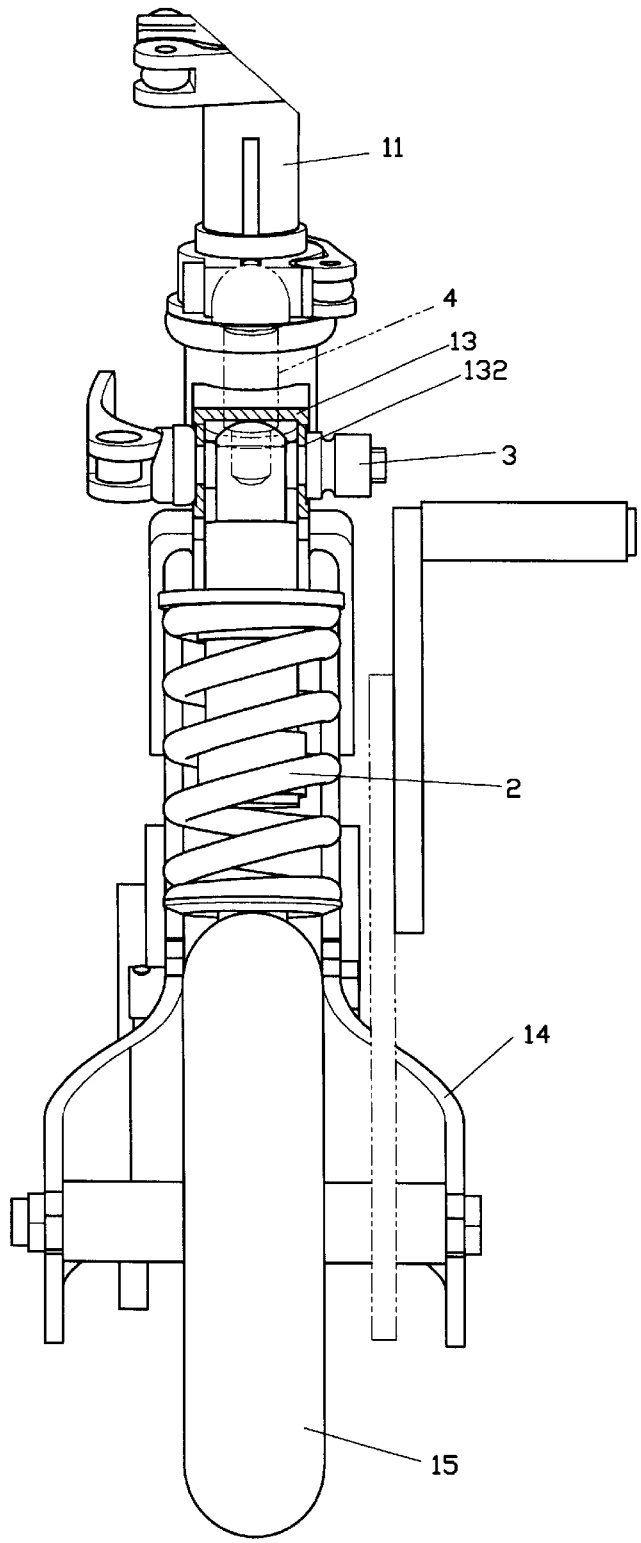
FIG. 5 is a rear view of the present invention.

To assemble the present invention, the bottom end of the shock absorber 2 is seated on the reinforcement 22 of the rear fork 14, and the top end of the shock absorber 2 is pivoted to the connecting device 13 by the quick-release connector 3, as shown in FIG. 3. The stopper head 411 of the stopper 41 is an arcuate shape, which moves along with the shock absorber 2 up and down, when a rider rides on a bumping road, this depresses the spring 42 within the barrel 43 and urges the stopper 41 to retreat upwardly. Upon the top end of the shock absorber 2 passes the stopper 41 and returns to the connecting device 13, as shown in FIGS. 4 and 5, the spring 42 urges the stopper 41 to return to its original position. Place the top end of the shock absorber 2 in the connecting device 13 with the quick-release connector 3 inserts into the slots 132 at respective sides of the connecting device 13 and tightened thereat to secure the shock absorber 2 between the connecting device 13 and the rear fork 14. Should the quick-release connector 3 loosen and cause the shock absorber 2 to loosen, the stopper 41 shall provide a secondary prevention of the shock absorber 2 from disengagement.

When folding the bicycle for storage, pull the block 44 upwardly, which brings the stopper 41 upwardly to depart from the original position, thus the shock absorber 2 may be disengaged.

I claim:

1. A shock absorber stopper for a bicycle comprising:

a seat pipe having a top end, said top end being adapted for mounting a bicycle seat thereto;

a rear fork member being coupled to a bracket, said bracket being mounted on a bicycle frame, said seat pipe projecting from said bicycle frame;

a rear wheel rotatably mounted to said rear fork member;

a connecting device mounted on a bottom end of said seat pipe, said connecting device pivotally receiving a top end of a shock absorber, said top end of said shock absorber being releasably held by a quick-release connector, a bottom end of said shock absorber being pivotally secured to said rear fork member, said connecting device of said seat pipe comprising a stopping unit preventing said shock absorber from disengagement, said stopping unit having a stopper extending through a spring and being secured in said connecting device.

* * * * *